US010333577B2

(12) United States Patent
Zhao et al.

(10) Patent No.: US 10,333,577 B2
(45) Date of Patent: Jun. 25, 2019

(54) MOBILE TERMINAL AND SYSTEM WITH MULTICHANNEL TRANSCEIVER

(71) Applicant: HUIZHOU TCL MOBILE COMMUNICATIONS CO., LTD., HuiZhou, Guangdong (CN)

(72) Inventors: Shiqing Zhao, HuiZhou (CN); Aiping George Guo, HuiZhou (CN); Shenggang Hu, HuiZhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 11 days.

(21) Appl. No.: 15/744,857

(22) PCT Filed: Dec. 2, 2016

(86) PCT No.: PCT/CN2016/108372
§ 371 (c)(1),
(2) Date: Jan. 15, 2018

(87) PCT Pub. No.: WO2017/190499
PCT Pub. Date: Nov. 9, 2017

(65) Prior Publication Data
US 2018/0212642 A1 Jul. 26, 2018

(30) Foreign Application Priority Data

May 4, 2016 (CN) .......................... 2016 1 0287982

(51) Int. Cl.
*H04W 88/06* (2009.01)
*H04B 1/40* (2015.01)
(Continued)

(52) U.S. Cl.
CPC ................. *H04B 1/40* (2013.01); *H04B 1/00* (2013.01); *H04B 1/006* (2013.01); *H04W 16/14* (2013.01); *H04W 88/06* (2013.01)

(58) Field of Classification Search
CPC .......... H04B 1/06; H04B 1/16; H04B 7/0452; H04B 1/30; H04B 1/525; H04B 1/0064;
(Continued)

(56) References Cited

U.S. PATENT DOCUMENTS 8,135,430 B2 3/2012 Plevridis
9,232,562 B2 1/2016 Liu et al.
(Continued)

FOREIGN PATENT DOCUMENTS

CN 105308868 A 2/2016
CN 105978579 A 9/2016

*Primary Examiner* — Quan M Hua
(74) *Attorney, Agent, or Firm* — Mark M. Friedman (57) ABSTRACT

A mobile terminal and a system with a multichannel transceiver are provided. The mobile terminal includes a central processing unit and a multichannel transceiver. The central processing unit outputs first and second transmitted signals to a first transmitter module and a second transmitter module. The first and second transmitted signals are filtered, frequency-converted, amplified, and transmitted to corresponding transmitting channels. First and second received signals received by a plurality of receiving channels are amplified and then transmitted to a first receiver module and a second receiver module, respectively, and the first and second received signals are frequency-converted, filtered, and output to the central processing unit.

20 Claims, 2 Drawing Sheets (51) Int. Cl.
*H04B 1/00* (2006.01)
*H04W 16/14* (2009.01)

(58) Field of Classification Search
CPC ........ H04B 1/109; H04B 15/00; H04B 17/21;
H04B 1/0028; H04B 1/0082; H04B 1/28;
H04B 7/0842; H04B 7/12; H04H 40/90;
H04H 40/18; H04L 27/00; H04L 27/04;
H04L 27/20; H04L 5/04; H04L 12/28;
H04L 12/6418; H04M 1/72519
See application file for complete search history.

(56) References Cited

U.S. PATENT DOCUMENTS

| | | | |
|---|---|---|---|
| 2009/0232191 A1* | 9/2009 | Gupta | H04L 27/2096 375/216 |
| 2014/0064339 A1* | 3/2014 | Kim | H04L 5/0051 375/219 |
| 2014/0077865 A1* | 3/2014 | Ashjaee | G01S 19/21 327/513 |
| 2015/0244548 A1 | 8/2015 | Weissman et al. | |

* cited by examiner

MOBILE TERMINAL AND SYSTEM WITH MULTICHANNEL TRANSCEIVER

CROSS REFERENCE TO RELATED APPLICATION

This application claims the priority of International Application No. PCT/CN2016/108372, filed on Dec. 2, 2016, which claims priority to Chinese Application No. 201610287982.6, filed on May 4, 2016. The entire disclosures of each of the above applications are incorporated herein by reference.

BACKGROUND OF THE INVENTION

1. Field of the Invention

The present disclosure relates to the technical field of mobile communications, and in particular to a mobile terminal and a system with a multichannel transceiver.

2. Description of the Related Art

As mobile terminals become intelligent, communications such as WIFI, BLUETOOTH, and 5G/4G/3G/2G are almost standard configurations for existing mobile terminals. However, transceivers are required for communications such as WIFI, BLUETOOTH, and 5G/4G/3G/2G. In the existing communication terminals, because the 5G/4G/3G/2G communications share a transceiver and the WIFI/BT (BLUETOOTH) communications exist independently and exclusively use a WIFI/BT transceiver, a terminal will have two receivers. In other words, the 5G/4G/3G/2G communications share one transceiver, and the WIFI/BT communications share the other transceiver. Thus, cost, size, and the like of terminals will undoubtedly be influenced greatly.

Thus, there is a need to improve and develop the prior art.

SUMMARY OF THE INVENTION

In view of the above-mentioned deficiencies in the prior art, an objective of the present disclosure is to provide a mobile terminal with a multichannel transceiver and a system having the same, which can solve the technical problems of high cost and large size of a mobile terminal due to the presence of a plurality of transceivers in the prior art.

In order to achieve the foregoing objective, the present disclosure provides the following technical solutions:

A mobile terminal with a multichannel transceiver includes:

a central processing unit and a multichannel transceiver, the central processing unit controlling the multichannel transceiver to receive or transmit RF signals, the multichannel transceiver including a plurality of power amplifiers, a first transmitter module, a second transmitter module, a plurality of low noise amplifiers, a first receiver module, a second receiver module, a switch module, and a reference clock module; wherein the switch module is configured to control on/off states of a plurality of transmitting channels; the reference clock module configured to output a reference signal to the first transmitter module, the second transmitter module, the first receiver module, and the second receiver module according to a reference clock signal output by the central processing unit;

during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, then transmit the first transmitted signal and the second transmitted signal to the plurality of power amplifiers for signal amplification and transmit the first transmitted signal and the second transmitted signal to corresponding transmitting channels for outputting; and during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output the first received signal and the second received signal to the central processing unit.

In the mobile terminal with a multichannel transceiver, the first transmitter module includes a first transmission control unit, a first transmission local oscillator circuit, a first low-pass filter, and a first transmission up-convertor; and the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then outputs the filtered first transmitted signal to the first transmission up-convertor; and, the first transmission up-convertor up-converts and modulates the filtered first transmitted signal according to the first transmission local oscillator clock signal.

In the mobile terminal with a multichannel transceiver, the second transmitter module includes a second transmission control unit, a second transmission local oscillator circuit, a second low-pass filter, and a second transmission up-convertor; and the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs the filtered second transmitted signal to the second transmission up-convertor; and the second transmission up-convertor up-converts and modulates the filtered second transmitted signal according to the second transmission local oscillator clock signal.

In the mobile terminal with a multichannel transceiver, the first receiver module includes a first reception control unit, a first reception local oscillator circuit, a third low-pass filter, and a first reception down-convertor; and the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs the first received signal to the third low-pass filter; and the third low-pass filter filters the first received signal which is subjected to the down-conversion demodulation, and outputs the filtered first received signal to the central processing unit.

In the mobile terminal with a multichannel transceiver, the second receiver module includes a second reception control unit, a second reception local oscillator circuit, a fourth low-pass filter, and a second reception down-convertor; and the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs the second received signal to the fourth low-pass filter; and the fourth low-pass filter filters the second received signal which is subjected to the down-conversion demodulation, and outputs the filtered second received signal to the central processing unit.

In the mobile terminal with a multichannel transceiver, the reference clock module includes an operational amplifier and a frequency multiplier; and the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit, and the second reception local oscillator circuit.

A mobile terminal with a multichannel transceiver includes:

a central processing unit and a multichannel transceiver, the central processing unit controlling the multichannel transceiver to receive or transmit RF signals, the multichannel transceiver including a plurality of power amplifiers, a first transmitter module, a second transmitter module, a plurality of low noise amplifiers, a first receiver module, and a second receiver module;

during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, then transmit the first transmitted signal and the second transmitted signal to the plurality of power amplifiers for signal amplification and transmit the first transmitted signal and the second transmitted signal to corresponding transmitting channels for outputting; and during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output the first received signal and the second received signal to the central processing unit.

In the mobile terminal with a multichannel transceiver, the first transmitter module includes a first transmission control unit, a first transmission local oscillator circuit, a first low-pass filter, and a first transmission up-convertor; and the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then outputs the filtered first transmitted signal to the first transmission up-convertor; and the first transmission up-convertor up-converts and modulates the filtered first transmitted signal according to the first transmission local oscillator clock signal.

In the mobile terminal with a multichannel transceiver, the second transmitter module includes a second transmission control unit, a second transmission local oscillator circuit, a second low-pass filter, and a second transmission up-convertor; and the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs the filtered second transmitted signal to the second transmission up-convertor; and the second transmission up-convertor up-converts and modulates the filtered second transmitted signal according to the second transmission local oscillator clock signal.

In the mobile terminal with a multichannel transceiver, the first receiver module includes a first reception control unit, a first reception local oscillator circuit, a third low-pass filter, and a first reception down-convertor; and the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs the first received signal to the third low-pass filter; and the third low-pass filter filters the first received signal which is subjected to the down-conversion demodulation, and outputs the filtered first received signal to the central processing unit.

In the mobile terminal with a multichannel transceiver, the second receiver module includes a second reception control unit, a second reception local oscillator circuit, a fourth low-pass filter, and a second reception down-convertor; and the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs the second received signal to the fourth low-pass filter; and the fourth low-pass filter filters the second received signal which is subjected to the down-conversion demodulation, and outputs the filtered second received signal to the central processing unit.

In the mobile terminal with a multichannel transceiver, the multichannel transceiver further includes a switch module configured to control the on/off states of a plurality of transmitting channels.

In the mobile terminal with a multichannel transceiver, the multichannel transceiver further includes a reference clock module configured to output a reference signal to the first transmitter module, the second transmitter module, the first receiver module, and the second receiver module according to a reference clock signal output by the central processing unit.

In the mobile terminal with a multichannel transceiver, the reference clock module includes an operational amplifier and a frequency multiplier; and the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit, and the second reception local oscillator circuit.

A system with a multichannel transceiver includes a mobile terminal, wherein the mobile terminal includes:

a central processing unit and a multichannel transceiver, the central processing unit controlling the multichannel transceiver to receive or transmit RF signals, the multichannel transceiver including a plurality of power amplifiers, a first transmitter module, a second transmitter module, a plurality of low noise amplifiers, a first receiver module, and a second receiver module;

during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, then transmit the first transmitted signal and the second transmitted signal to the plurality of power amplifiers for signal amplification and transmit the first transmitted signal and the second transmitted signal to corresponding transmitting channels for outputting; and during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output the first received signal and the second received signal to the central processing unit.

In the mobile terminal with a multichannel transceiver, the first transmitter module includes a first transmission control unit, a first transmission local oscillator circuit, a first low-pass filter, and a first transmission up-convertor;

the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then outputs the filtered first transmitted signal to the first transmission up-convertor; and the first transmission up-convertor up-converts and modulates the filtered first transmitted signal according to the first transmission local oscillator clock signal;

wherein the first receiver module includes a first reception control unit, a first reception local oscillator circuit, a third low-pass filter, and a first reception down-convertor; and the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs the first received signal to the third low-pass filter; and the third low-pass filter filters the first received signal which is subjected to the down-conversion demodulation, and outputs the filtered first received signal to the central processing unit.

In the mobile terminal with a multichannel transceiver, the second transmitter module includes a second transmission control unit, a second transmission local oscillator circuit, a second low-pass filter, and a second transmission up-convertor;

the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs the filtered second transmitted signal to the second transmission up-convertor; and the second transmission up-convertor up-converts and modulates the filtered second transmitted signal according to the second transmission local oscillator clock signal;

wherein the second receiver module includes a second reception control unit, a second reception local oscillator circuit, a fourth low-pass filter, and a second reception down-convertor; and the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs the second received signal to the fourth low-pass filter; and the fourth low-pass filter filters the second received signal which is subjected to the down-conversion demodulation, and outputs the filtered second received signal to the central processing unit.

In the mobile terminal with a multichannel transceiver, the multichannel transceiver further includes a switch module configured to control the on/off states of a plurality of transmitting channels.

In the mobile terminal with a multichannel transceiver, the multichannel transceiver further includes a reference clock module configured to output a reference signal to the first transmitter module, the second transmitter module, the first receiver module, and the second receiver module according to a reference clock signal output by the central processing unit.

In the mobile terminal with a multichannel transceiver, the reference clock module includes an operational amplifier and a frequency multiplier; and the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit, and the second reception local oscillator circuit.

Compared with the conventional technology, in the mobile terminal and the system with a multichannel transceiver of the present disclosure, the mobile terminal with a multichannel transceiver includes a central processing unit and a multichannel transceiver, wherein the central processing unit controls the multichannel transceiver to receive or transmit RF signals; the multichannel transceiver includes a plurality of power amplifiers, a first transmitter module, a second transmitter module, a plurality of low noise amplifiers, a first receiver module, and a second receiver module; during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, transmit the first transmitted signal and the second transmitted signal to the plurality of power amplifiers for signal amplification, and then transmit the first transmitted signal and the second transmitted signal to corresponding transmitting channels for outputting; and during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output the first received signal and the second received signal to the central processing unit. Thus, the cooperative communication in multiple modes and at multiple frequency bands is simultaneously supported by using a single transceiver so that the cost of the mobile terminal is reduced and the size of the terminal is decreased.

DETAILED DESCRIPTION OF THE PREFERRED EMBODIMENTS

In view of the disadvantages in the prior art that independent transceivers are required for signals in multiple modes and at multiple frequency bands so that both the cost and the size of a mobile terminal are increased, an objective of the present disclosure is to provide a mobile terminal and a system with a multichannel transceiver, which may simultaneously support the cooperative communication in multiple modes and at multiple frequency bands by using a single transceiver so that the cost of the mobile terminal is reduced and the size of the terminal is decreased.

To make the objectives, technical solutions, and effects of the present disclosure clearer and more explicit, the present disclosure will be further described below in details by embodiments with reference to the accompanying drawings. It should be understood that the specific embodiments described herein are merely for explaining the present disclosure and not intended to limit the present disclosure.

Figure 1:
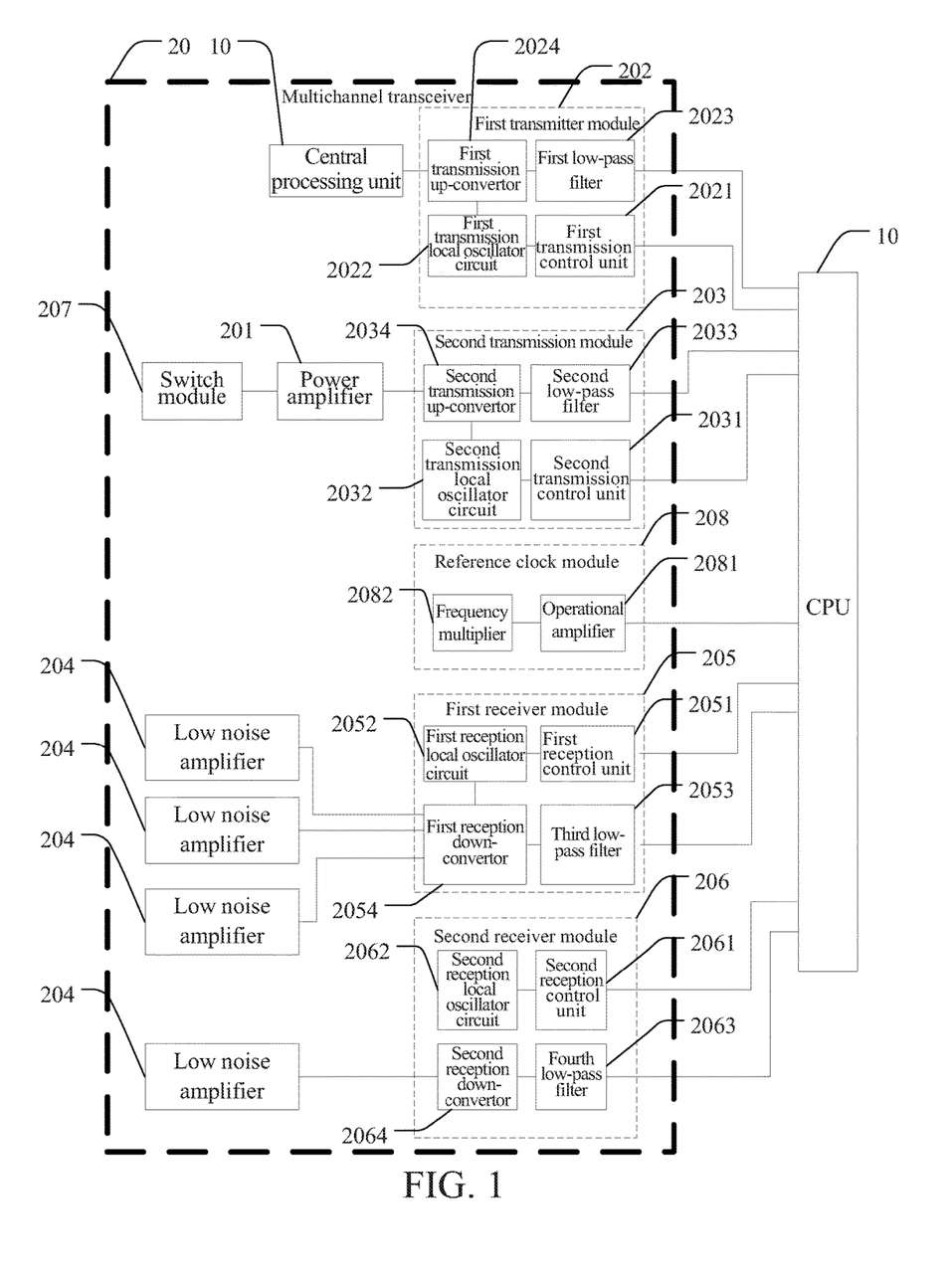
FIG. 1 is a structural block diagram of a mobile terminal with a multichannel transceiver according to the present disclosure.

Referring to FIG. 1, the mobile terminal with a multichannel transceiver 20 of the present disclosure includes a central processing unit 10 and a multichannel transceiver 20. The central processing unit 10 is connected to the multichannel transceiver 20, and the central processing unit 10 controls the multichannel transceiver 20 to receive or transmit RF signals. Wherein the multichannel transceiver 20 includes a plurality of power amplifiers 201, a first transmitter module 202, a second transmitter module 203, a plurality of low noise amplifiers 204, a first receiver module 205, and a second receiver module 206. The power amplifiers are connected to the first transmitter module 202 and the second transmitter module 203. Both the first transmitter module 202 and the second transmitter module 203 are connected to the central processing unit 10.

During the transmission of RF signals, the central processing unit 10 outputs a first transmitted signal and a second transmitted signal to the corresponding first transmitter module 202 and second transmitter module 203, and the first transmitter module 202 and the second transmitter module 203 filter and frequency-convert the first transmitted signal and the second transmitted signal, respectively, transmit the first transmitted signal and the second transmitted signal to the plurality of power amplifiers 201 for signal simplification, and then transmit the first transmitted signal and the second transmitted signal to corresponding transmitting channels for outputting, so that the cooperative transmission of a plurality of RF signals is realized. During the reception of RF signals, a first received signal and a second received signal are received by a plurality of receiving channels of the multichannel transceiver 20 and then amplified by the plurality of low noise amplifiers 204; the amplified first received signal and second received signal are transmitted to the first receiver module 205 and the second receiver module 206, respectively; and the first receiver module 205 and the second receiver module 206 frequency-convert and filter on the first received signal and the second received signal, respectively, and then output the first received signal and the second received signal to corresponding data receiving channels of the central processing unit 10 for corresponding subsequent processing, so that the data reception process of a plurality of RF signals is completed. Therefore, in the present disclosure, by providing corresponding data receiving/transmitting channels, transmitter modules and receiver modules in the multichannel transceiver 20, the cooperative communication of RF signals in multiple modes and at multiple frequency bands may be realized. Accordingly, the cost of the mobile terminal is reduced, and the size of the terminal is decreased.

Specifically, the first transmitter module 202 includes a first transmission control unit 2021, a first transmission local oscillator circuit 2022, a first low-pass filter 2023, and a first transmission up-convertor 2024. The first transmission control unit 2021 is connected to the central processing unit 10 and the first transmission local oscillator circuit 2022. The first transmission local oscillator circuit 2022 is also connected to the first transmission up-convertor 2024. The first transmission up-convertor 2024 is connected to the power amplifiers, and also connected to the central processing unit 10 through the first low-pass filter 2023.

The first transmission control unit 2021 controls the first transmission local oscillator circuit 2022 to output a first transmission local oscillator clock signal according to a first transmission control signal output by the central processing unit 10 and a reference clock, and sends the first transmission local oscillator clock signal to the first transmission up-convertor 2024. The first low-pass filter 2023 filters the first transmitted signal and then outputs the filtered first transmitted signal to the first transmission up-convertor 2024. Clutter interference in the first transmitted signal may be filtered by the first low-pass filter 2023, so that the stability of the signal is improved. Subsequently, the first transmission up-convertor 2024 up-converts and modulates the filtered first transmitted signal according to the first transmission local oscillator clock signal, so that the first transmitted signal conforms to the frequency band requirements for the corresponding transmitting channels.

Correspondingly, the second transmitter module 203 includes a second transmission control unit 2031, a second transmission local oscillator circuit 2032, a second low-pass filter 2033, and a second transmission up-convertor 2034. The second transmission control unit 2031 is connected to the central processing unit 10 and the second transmission local oscillator circuit 2032. The second transmission local oscillator circuit 2032 is also connected to the second transmission up-convertor 2034. The second transmission up-convertor 2034 is connected to the power amplifiers, and also connected to the central processing unit 10 through the second low-pass filter 2033.

The second transmission control unit 2031 controls the second transmission local oscillator circuit 2032 to output a second transmission local oscillator clock signal according to a second transmission control signal output by the central processing unit 10 and a reference clock, and sends the second transmission local oscillator clock signal to the second transmission up-convertor 2034. The second low-pass filter 2033 filters the second transmitted signal and then outputs the filtered second transmitted signal to the second transmission up-convertor 2034. Clutter interference in the first transmitted signal may be filtered by the second low-pass filter 2034, so that the stability of the signal is improved. Subsequently, the second transmission up-convertor 2034 up-converts and modulates the filtered second transmitted signal according to the second transmission local oscillator clock signal, so that the second transmitted signal conforms to the frequency band requirements for the corresponding transmitting channels.

Further, the first receiver module 205 includes a first reception control unit 2051, a first reception local oscillator circuit 2052, a third low-pass filter 2053, and a first reception down-convertor 2054. The first reception control unit 2051 is connected to the central processing unit 10 and the first reception local oscillator circuit 2052. The first reception local oscillator circuit 2052 is also connected to the first reception down-convertor 2054. The first reception down-convertor 2054 is connected to the low noise amplifiers 204, and also connected to the central processing unit 10 through the third low-pass filter 2053.

The first reception control unit 2051 controls the first reception local oscillator circuit 2052 to output a first reception local oscillator clock signal according to a first reception control signal output by the central processing unit 10 and a reference clock, and sends the first reception local oscillator clock signal to the first reception down-convertor 2054. The first reception down-convertor 2054 down-converts and demodulates the first received signal according to the first reception local oscillator clock signal and then outputs the first received signal to the third low-pass filter 2053. Subsequently, the third low-pass filter 2053 filters the first received signal which is subjected to the down-conversion demodulation, and outputs the filtered first received signal to a corresponding data receiving channel of the central processing unit 10.

Correspondingly, the second receiver module 206 includes a second reception control unit 2061, a second reception local oscillator circuit 2062, a fourth low-pass filter 2063, and a second reception down-convertor 2064. The second reception control unit 2061 is connected to the central processing unit 10 and the second reception local oscillator circuit 2062. The second reception local oscillator circuit 2062 is also connected to the second reception down-convertor 2064. The second reception down-convertor 2064 is connected to the low noise amplifiers 204, and also connected to the central processing unit 10 through the fourth low-pass filter 2063.

The second reception control unit 2061 controls the second reception local oscillator circuit 2062 to output a second reception local oscillator clock signal according to a second reception control signal output by the central processing unit 10 and a reference clock, and sends the second reception local oscillator clock signal to the second reception down-convertor 2064. The second reception down-convertor 2064 down-converts and demodulates the second received signal according to the second reception local oscillator clock signal and then outputs the second received signal to the fourth low-pass filter 2063. The fourth low-pass filter 2063 filters the second received signal which is subjected to the down-conversion demodulation, and outputs the filtered second received signal to a corresponding data receiving channel of the central processing unit 10. During specific implementations, the low noise amplifiers 204 connected to the first reception down-convertor 2054 and the second reception down-convertor 2064 may be correspondingly selected according to the receiving frequency band corresponding to each receiving channel.

Preferably, the multichannel transceiver 20 further includes a switch module 207. The switch module 207 is connected to the power amplifiers and configured to control the on/off states of a plurality of transmitting channels. Specifically, the central processing unit 10 controls the switch module 207 to perform handover, so that the RF signals are output by corresponding channels, without resulting in channel disorder.

Continuing to refer to FIG. 1, the mobile terminal with a multichannel transceiver 20 of the present disclosure further includes a reference clock module 208. The reference clock module 208 is connected to the central processing unit 10 and configured to output a reference clock to the first transmitter module 202, the second transmitter module 203, the first receiver module 205, and the second receiver module 206 according to a reference clock signal output by the central processing unit 10.

Specifically, the reference clock module 208 includes an operational amplifier 2081 and a frequency multiplier 2082. The operational amplifier 2081 is connected to the central processing unit 10 and the frequency multiplier 2082. After the reference clock signal output by the central processing unit 10 is amplified and multiplied by the operational amplifier 2081 and the frequency multiplier 2082, respectively, a reference clock is output to the first transmission local oscillator circuit 2022, the second transmission local oscillator circuit 2032, the first reception local oscillator circuit 2052, and the second reception local oscillator circuit 2062. Subsequently, the first transmission local oscillator circuit 2022, the second transmission local oscillator circuit 2032, the first reception local oscillator circuit 2052, and the second reception local oscillator circuit 2062 output, according to the reference clock and the corresponding transmission control signals and reception control signals, a first transmission local oscillator clock signal, a second transmission local oscillator clock signal, a first reception control signal, and a second reception control signal, respectively.

The present disclosure correspondingly provides a system with a multichannel transceiver 20, including the mobile terminal with a multichannel transceiver 20 described above. The mobile terminal with a multichannel transceiver 20 has been described above in detail, and will not be repeated here.

To better understand the technical solutions of the present disclosure, the operation process of the mobile terminal with a multichannel transceiver 20 of the present disclosure will be described below in detail by specific embodiments with reference to FIGS. 1 and 2.

Figure 2:
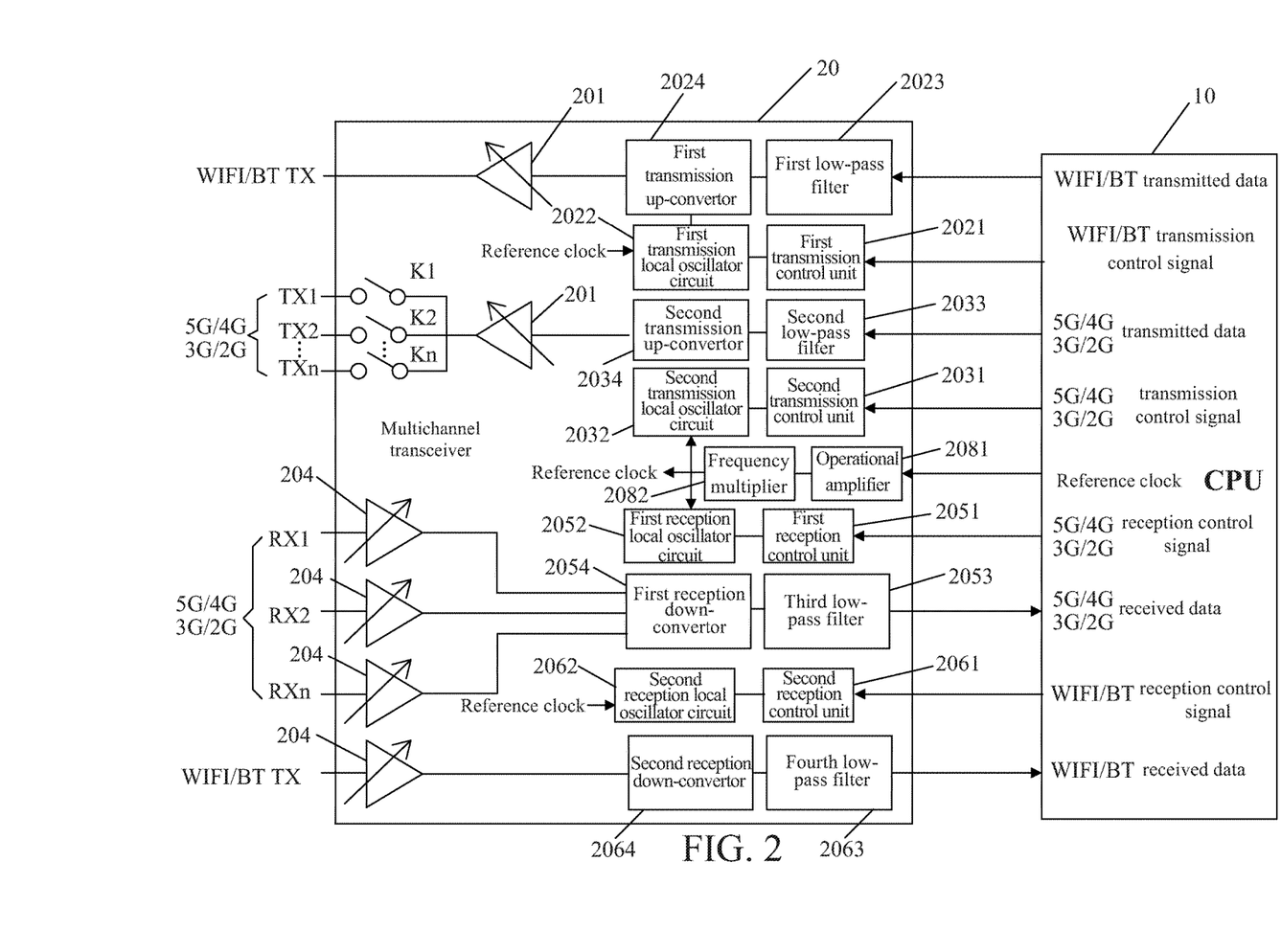
FIG. 2 is a principle diagram of a preferred embodiment of the mobile terminal with a multichannel transceiver according to the present disclosure.

As shown in FIG. 2, in a preferred embodiment of the present disclosure, an independent communication channel is set for the WIFI/BT, and the WIFI and the BLUETOOTH may access this channel by time division multiplexing; an independent communication channel is also set for the 5G/4G/3G/2G, and the 5G/4G/3G/2G may also access this channel by time division multiplexing; and the two channels are independent of each other and integrated into one transceiver.

Specifically, during the transmission of RF signals, WIFI/BT and 5G/4G/3G/2G transmitted data, output by a CPU, enters corresponding low-pass filters of the multichannel transceiver 20 for filtering, respectively. In other words, the WIFI/BT transmitted data enters the first low-pass filter 2023, and the 5G/4G/3G/2G transmitted data enters the second low-pass filter 2033. Subsequently, up-conversion modulation is performed on the WIFI/BT transmitted data and the 5G/4G/3G/2G transmitted data by corresponding transmission up-convertors, respectively. In other words, the WIFI/BT transmitted data enters the first transmission up-convertor 2024 for up-conversion modulation, and the 5G/4G/3G/2G transmitted data enters the second transmission up-convertor 2034 for up-conversion modulation. The transmitted data which is subjected to the up-conversion modulation enters corresponding power amplifiers for signal amplification, respectively, and the amplified modulated signals are output by respective transmitting channels. For example, the WIFI/BT transmitted signal is directly output by a WIFI/BT TX channel, and the 5G/4G/3G/2G transmitted signal is output by a channel corresponding to TX1/TX2/ . . . /TXn. The handover of the on/off states of each output channel is realized by controlling the state of the corresponding switches K1/K2/ . . . /Kn by the CPU.

During the reception of RF signals, the multichannel transceiver 20 receives RF signals from the WIFI/BT and 5G/4G/3G/2G. The received RF signals enter the multichannel transceiver 20 through respective receiving channels. In other words, the WIFI/BT RF signal enters a WIFI-BT RX receiving channel, and the 5G/4G/3G/2G RF signal enters channels RX1, RX2, . . . RXn according to the requirements, respectively. The respective receiving channels corresponding to the WIFI/BT and 5G/4G/3G/2G are provided with respective low noise amplifiers 204, respectively. The corresponding low noise amplifiers 204 are designed according to the receiving frequency band corresponding to each receiving channel, so that the low noise amplifier 204 of each channel is matched with the frequency band received by this channel. The received signals are simplified by the respective low noise amplifiers 204LNA, and the amplified received signals enter respective reception down-convertors for down-conversion demodulation. That is, the WIFI/BT received signal enters the second down-convertor for down-conversion demodulation, and the 5G/4G/3G/2G received signal enters the first down-convertor for down-conversion demodulation. The signals which are subjected to the down-conversion demodulation are low-pass filtered by respective low-pass filters to filter clutter interference. The WIFI/BT demodulated signal enters the fourth low-pass filter 2063 for filtering, and the 5G/4G/3G/2G demodulated signal enters the third low-pass filter 2053 for filtering. The demodulated signals are filtered by the respective low-pass filters and then output from the multichannel transceiver 20, and finally enter corresponding data receiving channels of the CPU. Upon receiving the data, the CPU performs subsequent related processing. So far, the receiving process of the WIFI/BT and 5G/4G/3G/2G data is completed.

Further, the local oscillator reference clock required by the up-convertors and down-convertors for WIFI/BT and 5G/4G/3G/2G of the multichannel transceiver 20 comes from the CPU. The CPU outputs a reference clock signal to the multichannel transceiver 20, and the reference clock signal is received by the multichannel transceiver 20 and then amplified by the operational amplifier 2081. The reference clock signal amplified by the operational amplifier 2081 is multiplied by the frequency multiplier 2082N to form a reference clock which is provided to the transmission and reception local oscillator circuits for WiFi/BT and 5G/4G/3G/2G, i.e., the first transmission local oscillator circuit 2022, the second transmission local oscillator circuit 2-32, the first reception local oscillator circuit 2052, and the second reception local oscillator circuit 2062. The first transmission local oscillator circuit 2022 and the second transmission local oscillator circuit 2032 are controlled by a first transmission control signal and a second transmission control signal from the CPU, respectively, to generate respective target transmission local oscillator clock signals, i.e., a first transmission local oscillator clock signal and a second transmission local oscillator clock signal. Subsequently, the first transmission local oscillator clock signal and the second local oscillator clock signal are provided to the corresponding transmission up-convertors, and the transmission up-convertors perform up-conversion modulation on the transmitted data according to the corresponding transmission local oscillator clock signals. The first reception local oscillator circuit 2052 and the second reception local oscillator circuit 2062 are controlled by a first reception control signal and a second reception control signal from the CPU, respectively, to generate respective target reception local oscillator clock signals, i.e., a first reception local oscillator clock signal and a second reception local oscillator clock signal. Subsequently, the first reception local oscillator clock signal and the second reception local oscillator clock signal are provided to the corresponding reception down-convertors, and the reception down-convertors perform down-conversion demodulation on the respective received data according to the corresponding reception local oscillator clock signals. Thus, the cooperative communication of RF signals in multiple modes and at multiple frequency bands is realized. Consequently, the cost of the mobile terminal is effectively reduced, and the size of the terminal is decreased.

In conclusion, in the mobile terminal and the system with a multichannel transceiver the present disclosure, the mobile terminal with a multichannel transceiver includes a central processing unit and a multichannel transceiver, wherein the central processing unit controls the multichannel transceiver to receive or transmit RF signals; the multichannel transceiver includes a plurality of power amplifiers, a first transmitter module, a second transmitter module, a plurality of low noise amplifiers, a first receiver module, and a second receiver module; during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, transmit the first transmitted signal and the second transmitted signal, respectively, to the plurality of power amplifiers for signal amplification, and then transmit the first transmitted signal and the second transmitted signal to corresponding transmitting channels for outputting; and during the reception of RF signals, a first received signal and a second received signal received by a plurality of receiving channels are amplified by the plurality of low noise amplifiers, respectively, and then transmitted to the first receiver module and the second receiver module, respectively, and the first receiver module and the second receiver module frequency-convert and filter on the first received signal and the second received signal, respectively, and then output the first received signal and the second received signal to the central processing unit. Thus, the cooperative communication in multiple modes and at multiple frequency bands is simultaneously supported by using a single transceiver so that the cost of the mobile terminal is reduced and the size of the terminal is decreased.

It should be understood that, for a person of ordinary skill in the art, equivalent replacements or alterations may be made according to the technical solutions of the present disclosure and the inventive concept, and all the alterations or replacements shall fall into the protection scope defined by the appended claims of the present disclosure.

What is claimed is:

1. A mobile terminal comprising:
    a central processing unit and a multichannel transceiver, the central processing unit controlling the multichannel transceiver to receive or transmit RF signals, the multichannel transceiver comprising a plurality of power amplifiers, a first transmitter module, a second transmitter module, a plurality of low noise amplifiers, a first receiver module, a second receiver module, a switch module, and a reference clock module; wherein the switch module is configured to control on/off states of a plurality of transmitting channels; the reference clock module configured to output a reference signal to the first transmitter module, the second transmitter module, the first receiver module, and the second receiver module according to a reference clock signal output by the central processing unit;
    during the transmission of RF signals, the central processing unit outputs a first transmitted signal and a second transmitted signal to the first transmitter module and the second transmitter module, and the first transmitter module and the second transmitter module filter and frequency-convert the first transmitted signal and the second transmitted signal, respectively, then transmit a filtered and frequency-converted first transmitted signal and a filtered and frequency-converted second transmitted signal to the plurality of power amplifiers for signal amplification and transmit the first transmitted signal and the second transmitted signal to corresponding transmitting channels for outputting; and
    during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output the first received signal and the second received signal to the central processing unit.

2. The mobile terminal according to claim 1, wherein the first transmitter module comprises a first transmission control unit, a first transmission local oscillator circuit, a first low-pass filter, and a first transmission up-convertor, and the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then outputs a filtered first transmitted signal to the first transmission up-convertor, and the first transmission up-convertor up-converts and modulates the filtered first transmitted signal according to the first transmission local oscillator clock signal.

3. The mobile terminal according to claim 1, wherein the second transmitter module comprises a second transmission control unit, a second transmission local oscillator circuit, a second low-pass filter, and a second transmission up-convertor; and
    the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs a filtered second transmitted signal to the second transmission up-convertor, and the second transmission up-convertor up-converts and modulates the filtered second transmitted signal according to the second transmission local oscillator clock signal.

4. The mobile terminal according to claim 1, wherein the first receiver module comprises a first reception control unit, a first reception local oscillator circuit, a third low-pass filter, and a first reception down-convertor; and
    the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs the first received signal to the third low-pass filter, and, the third low-pass filter filters a down-converted and demodulated first received signal, and outputs a filtered first received signal to the central processing unit.

5. The mobile terminal according to claim 1, wherein the second receiver module comprises a second reception control unit, a second reception local oscillator circuit, a fourth low-pass filter, and a second reception down-convertor; and
    the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs the second received signal to the fourth low-pass filter; and the fourth low-pass filter filters a down-converted and demodulated second received signal, and outputs a filtered second received signal to the central processing unit.

6. The mobile terminal according to claim 1, wherein the reference clock module comprises an operational amplifier and a frequency multiplier; and the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit and the second reception local oscillator circuit.

7. A mobile terminal, comprising:
a central processing unit and a multichannel transceiver, the central processing unit controlling the multichannel transceiver to receive or transmit RF signals, the multichannel transceiver comprising a plurality of power amplifiers, a first transmitter module, a second transmitter module, a plurality of low noise amplifiers, a first receiver module, and a second receiver module;
during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, then transmit a filtered and frequency-converted first transmitted signal and a filtered and frequency-converted second transmitted signal to the plurality of power amplifiers for signal amplification and transmit an amplified first transmitted signal and an amplified second transmitted signal to corresponding transmitting channels for outputting; and
during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output a frequency-converted and filtered first received signal and a frequency-converted and filtered second received signal to the central processing unit.

8. The mobile terminal according to claim 7, wherein the first transmitter module comprises a first transmission control unit, a first transmission local oscillator circuit, a first low-pass filter, and a first transmission up-convertor; and
the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then output a filtered first transmitted signal to the first transmission up-convertor; and the first transmission up-convertor up-converts and modulates the filtered first transmitted signal according to the first transmission local oscillator clock signal.

9. The mobile terminal according to claim 7, wherein the second transmitter module comprises a second transmission control unit, a second transmission local oscillator circuit, a second low-pass filter, and a second transmission up-convertor; and
the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs a filtered second transmitted signal to the second transmission up-convertor, and the second transmission up-convertor up-converts and modulates the filtered second transmitted signal according to the second transmission local oscillator clock signal.

10. The mobile terminal according to claim 7, wherein the first receiver module comprises a first reception control unit, a first reception local oscillator circuit, a third low-pass filter, and a first reception down-convertor; and
the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs a down-converted and demodulated first received signal to the third low-pass filter; and, the third low-pass filter filters the down-converted and demodulated first received signal, and outputs a filtered first received signal to the central processing unit.

11. The mobile terminal according to claim 7, wherein the second receiver module comprises a second reception control unit, a second reception local oscillator circuit, a fourth low-pass filter, and a second reception down-convertor, and
the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs a down-converted and demodulated second received signal to the fourth low-pass filter; and the fourth low-pass filter filters the down-converted and demodulated second received signal, and outputs a filtered second received signal to the central processing unit.

12. The mobile terminal according to claim 7, wherein the multichannel transceiver further comprises a switch module configured to control the on/off states of a plurality of transmitting channels.

13. The mobile terminal according to claim 7, wherein the multichannel transceiver further comprises a reference clock module configured to output a reference signal to the first transmitter module, the second transmitter module, the first receiver module, and the second receiver module according to a reference clock signal output by the central processing unit.

14. The mobile terminal according to claim 13, wherein the reference clock module comprises an operational amplifier and a frequency multiplier; and, the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit, and the second reception local oscillator circuit.

15. A system, comprises:
a mobile terminal having a central processing unit and a multichannel transceiver, the central processing unit controlling the multichannel transceiver to receive or transmit RF signals, the multichannel transceiver comprising a plurality of power amplifiers, a first transmitter module, a second transmitter module, a plurality of low noise amplifiers, a first receiver module, and a second receiver module;

during the transmission of RF signals, the central processing unit outputs a first transmitted signal and a second transmitted signal to the corresponding first transmitter module and second transmitter module, and the first transmitter module and the second transmitter module filter and frequency-convert the first transmitted signal and the second transmitted signal, respectively, then transmit a filtered and frequency-converted first transmitted signal and the filtered and frequency-converted second transmitted signal to the plurality of power amplifiers for signal amplification and transmit an amplified first transmitted signal and an amplified second transmitted signal to corresponding transmitting channels for outputting; and during the reception of RF signals, a first received signal and a second received signal received by a plurality of receiving channels are amplified by the plurality of low noise amplifiers and then transmitted to the first receiver module and the second receiver module, respectively, and the first receiver module and the second receiver module frequency-convert and filter on the first received signal and the second received signal, respectively, and then output a frequency-converted and filtered first received signal and a frequency-converted and filtered second received signal to the central processing unit.

16. The system according to claim 15, wherein the first transmitter module comprises a first transmission control unit, a first transmission local oscillator circuit, a first low-pass filter, and a first transmission up-convertor;

the first transmission control unit controls the first transmission local oscillator circuit to output a first transmission local oscillator clock signal to the first transmission up-convertor according to a first transmission control signal output by the central processing unit and a reference block; the first low-pass filter filters the first transmitted signal and then output the filtered first transmitted signal to the first transmission up-convertor, and, the first transmission up-convertor up-converts and modulates the filtered first transmitted signal according to the first transmission local oscillator clock signal;

wherein the first receiver module comprises a first reception control unit, a first reception local oscillator circuit, a third low-pass filter, and a first reception down-convertor, and the first reception control unit controls the first reception local oscillator circuit to output a first reception local oscillator clock signal to the first reception down-convertor according to a first reception control signal output by the central processing unit and a reference clock; the first reception down-convertor down-converts and demodulates the first received signal according to the first reception local oscillator clock signal and then outputs a down-converted and demodulated first received signal to the third low-pass filter; and the third low-pass filter filters the down-converted and demodulated first received signal, and outputs a filtered first received signal to the central processing unit.

17. The system according to claim 15, wherein the second transmitter module comprises a second transmission control unit, a second transmission local oscillator circuit, a second low-pass filter, and a second transmission up-convertor;

the second transmission control unit controls the second transmission local oscillator circuit to output a second transmission local oscillator clock signal to the second transmission up-convertor according to a second transmission control signal output by the central processing unit and a reference block; the second low-pass filter filters the second transmitted signal and then outputs a filtered second transmitted signal to the second transmission up-convertor; and the second transmission up-convertor up-converts and modulates the filtered second transmitted signal according to the second transmission local oscillator clock signal;

wherein the second receiver module comprises a second reception control unit, a second reception local oscillator circuit, a fourth low-pass filter, and a second reception down-convertor; and the second reception control unit controls the second reception local oscillator circuit to output a second reception local oscillator clock signal to the second reception down-convertor according to a second reception control signal output by the central processing unit and a reference clock; the second reception down-convertor down-converts and demodulates the second received signal according to the second reception local oscillator clock signal and then outputs a down-converted and demodulated second received signal to the fourth low-pass filter, and the fourth low-pass filter filters the down-converted and demodulated second received signal, and outputs a filtered second received signal to the central processing unit.

18. The system according to claim 15, wherein the multichannel transceiver further comprises a switch module configured to control the on/off states of a plurality of transmitting channels.

19. The system according to claim 15, wherein the multichannel transceiver further comprises a reference clock module configured to output a reference signal to the first transmitter module, the second transmitter module, the first receiver module, and the second receiver module according to a reference clock signal output by the central processing unit.

20. The system according to claim 19, wherein the reference clock module comprises an operational amplifier and a frequency multiplier, and the reference clock signal output by the central processing unit is amplified and multiplied by the operational amplifier and the frequency multiplier, and then output as a reference clock to the first transmission local oscillator circuit, the second transmission local oscillator circuit, the first reception local oscillator circuit and the second reception local oscillator circuit.

* * * * *